United States Patent Office 3,448,335
Patented June 3, 1969

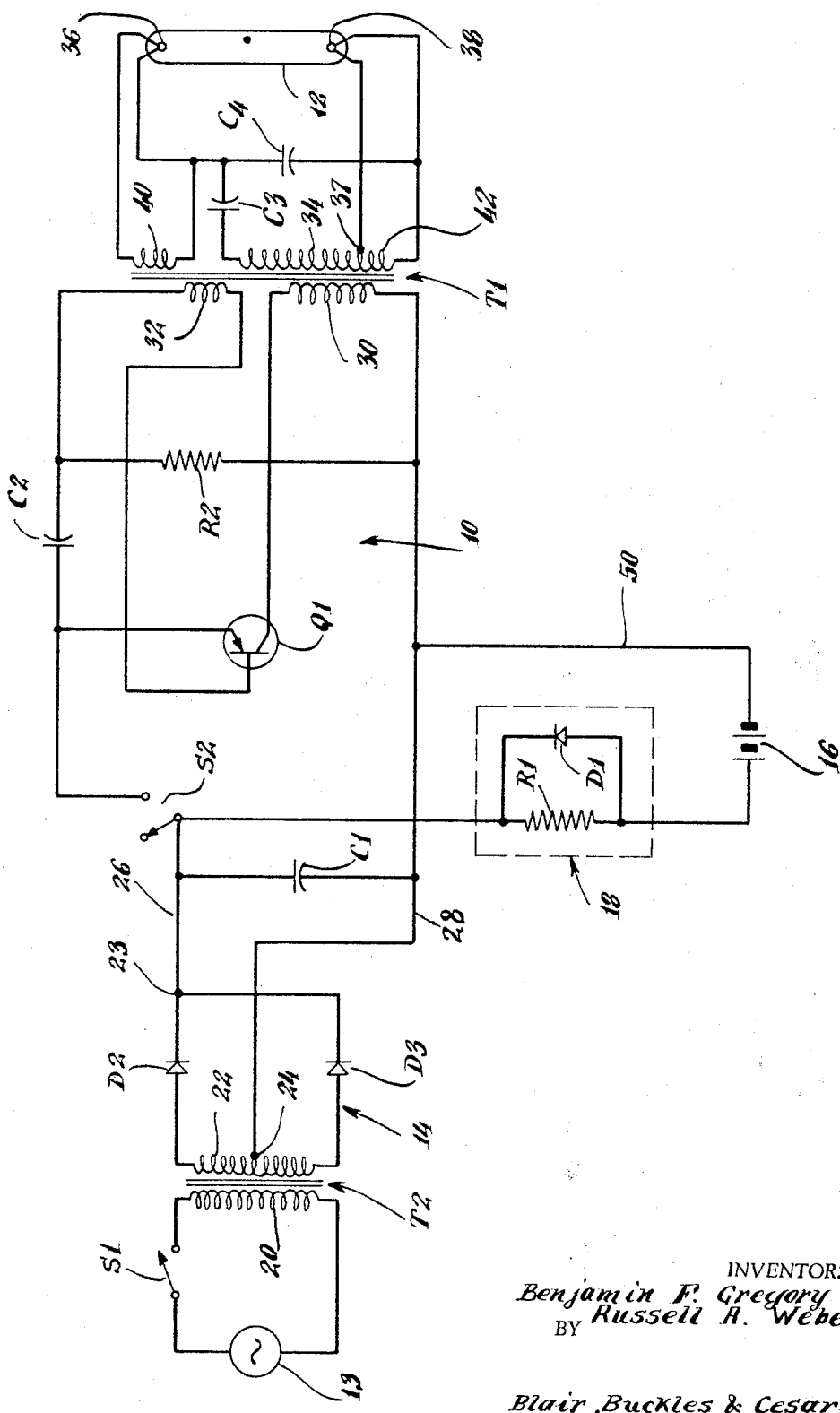

3,448,335
HIGH FREQUENCY AC-DC FLUORESCENT LAMP DRIVER CIRCUIT
Benjamin F. Gregory and Russell A. Weber, Tampa, Fla., assignors to Trak Microwave Corporation, Tampa, Fla.
Filed July 22, 1966, Ser. No. 567,270
Int. Cl. H05b 41/29
U.S. Cl. 315—171        7 Claims

ABSTRACT OF THE DISCLOSURE

An AC-DC drive circuit for a fluorescent lamp is disclosed wherein a transistor oscillator is normally powered by the full-wave rectified DC output from a power supply connected with a conventional AC power main. A battery in series with a resistor is connected across the rectified power output to receive a trickle charge so long as the AC power remains on, and a diode across this resistor is poled to shunt the resistor when AC power fails and thereby connects the battery directly to drive the transistor oscillator. The high frequency output of the transistor oscillator is applied to the fluorescent lamp through an output transformer circuit which includes a capacitor to form a resonant tuned circuit with the transformer secondary inductance, whereby short duration high frequency pulses generated by the transistor are converted into a sinusoidal wave form at the same high frequency, to energize the fluorescent lamp most efficiently.

---

The present invention relates to circuitry for energizing electron discharge devices, such as fluorescent lamps. More particularly, it relates to a fluorescent lamp driver circuit for delivering high-frequency electrical energy to a fluorescent lamp. The fluorescent lamp driver circuit embodying the invention is connected to a commercially available source of AC power and also to a battery source of DC power. The driver circuit is normally powered from the AC source but automatically converts to operation from the battery source in the event AC power is lost. Thus, the invention has significant but not necessarily limited application as a power supply for emergency lighting when electrical utility service is disrupted.

It is well known that fluorescent lamps are superior to incandescent lamps from the standpoint of increased light output, reduced power consumption, and longer life. Accordingly, fluorescent lighting has gained wide acceptance and is used extensively in permanent lighting systems where commercial AC power is available. Battery-powered fluorescent lighting systems, heretofore, have not been practical because of the necessity of high striking voltages to initiate fluorescent lamp operation. Electromechanical vibrators have been used and are being used in fluorescent lamp driver circuits to convert relatively low DC voltage derived from a battery to an AC voltage. This AC voltage is stepped up to a higher AC voltage using a transformer. The fluorescent lamp is energized from the high voltage electrical power appearing across the secondary of the step-up transformer.

With the advent of transistors, solid-state inverter circuits have been developed for converting DC electrical power, such as derived form a battery, to AC electrical power. As has been suggested, the solid-state inverter circuit can be used in place of electromechanical vibrators in battery-powered fluorescent lamp drivers.

It is know that fluorescent lamps operate more efficiently at frequencies in excess of sixty cycles per second, the characteristic frequency of commercially available AC power. Inverter circuits operating essentially as power oscillators are readily capable of taking advantage of this fact since they can be designed to develop AC power over a wide range of frequencies, all in excess of sixty cycles per second.

Accordingly, it is an object of the present invention to provide a driver circuit for fluorescent lamps, and the like, wherein the fluorescent lamp is operated with increased efficiency.

An additional object is to provide a fluorescent lamp driver circuit of the above character for supplying high-frequency AC power to a fluorescent lamp.

Still another object is to provide a fluorescent lamp driver circuit of the above character capable of being powered from commercially available AC sources.

Yet another object of the present invention is to provide a fluorescent lamp driver circuit of the above character capable of being powered by a relatively low voltage DC battery source.

Another object is to provide a fluorescent lamp driver circuit of the above character adapted to normally operate from an AC power source but to automatically convert to operation from a DC battery source in the event AC power is lost.

A further object is to provide a fluorescent lamp driver circuit of the above character wherein the DC power supply battery is continuously being recharged while the driver circuit is powered from the AC source.

A still further object is to provide a fluorescent lamp driver circuit of the above character which includes a solid-state power oscillator circuit.

Another object is to provide a fluorescent lamp driver circuit of the above character which is efficient in operation, simplified in design, inexpensive to manufacture, and rugged in construction.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which the sole figure is a detailed circuit schematic diagram of a fluorescent lamp driver circuit embodying the invention.

Broadly stated, the fluorescent lamp driver circuit seen in the drawing comprises a power oscillator, generally indicated at 10, for supplying high-frequency electrical energization to a fluorescent lamp 12 by way of a saturable core output transformer T1. The fluorescent lamp may range from the 8-watt miniature size to the conventional 40-watt size. A source 13 supplies AC power by way of an input transformer T2. A full-wave rectifier network, generally indicated at 14, converts this AC input power to DC power for energizing the power oscillator 10. At the same time, a DC battery supply 16 is connected through a network, generally indicated at 18, to supply energization to the power oscillator 10 in the event AC output power from the source 13 discontinues.

The network 18 includes a resistor R1 which enables the battery 16 to be trickle-charged during such times as the AC source 13 is supplying power to energize the power oscillator 10. The network 18 also includes a diode D1 shunting the resistor R1 and poled such as to connect the battery 16 directly to the power supply inputs of the power oscillator 10 at such other times when the source 13 for some reason fails to provide AC output power.

Referring more specifically to the drawing, the AC source 13 is connectable across a primary winding 20 of input transformer T2 by a switch S1. The source 13 is assumed to supply customary 112 volts AC at sixty cycles per second.

A secondary winding 22 of input transformer T2 has a turns ratio relative to the primary winding 20 such as to step down the AC voltage supplied by the source 13. One side of the transformer secondary winding 22 is connected to the anode of a diode D2 while the other side is connected to the anode of a diode D3. The cathodes of diodes D2 and D3, included in the rectifier network 14, are connected in common at a junction 23. The transformer secondary winding 22 is center-tapped at 24 such that a full-wave rectified voltage is developed between line 26 connected to junction 23 and line 28 connected to center tap 24. It is seen that the diodes D2 and D3 are poled such that line 26 is positive relative to line 28. A capacitor C1 is connected across lines 26 and 28 to smooth out this full-wave rectified voltage.

Line 26 is connectable through a switch S2 to supply a plus DC voltage to the emitter of a transistor Q1 of the power oscillator 10. The collector of transistor Q1 is connected through a primary winding 30 of output transformer T1 to line 28. The emitter is connected through a capacitor C2 and a secondary winding 32 of output transformer T1 to the base of transistor Q1. The junction between capacitor C2 and secondary winding 32 is connected through a resistor R2 to line 28.

The operation of the power oscillator 10 is the same whether receiving its energization from the AC source 13 or the battery 16. When switch S2 closes, the capacitor C2 and resistor R2 are effectively connected in series across lines 26 and 28. Capacitor C2 begins charging to the voltage across lines 26 and 28 at a rate determined by its capacitive value and the resistance value of resistor R2. As will be seen, resistor R2 and capacitor C2 determine the pulse repetition rate or frequency of the power oscillator 10. After a predetermined time interval, the voltage across capacitor C2, connected directly to the emitter and through the secondary winding 32 to the base, will attain a value sufficient to bias transistor Q1 on.

At this point, current flows from line 26 through the emitter-collector circuit of transistor Q1 and the primary winding 30 of transformer T1 to line 28. Capacitor C2 discharges through transistor Q1. Current through primary winding 30 induces a voltage across secondary winding 32 of a polarity such as to supply regenerative feedback to the base of transistor Q1. This regenerative feedback increases the forward bias of the emitter-base junction of transistor Q1 resulting in increased current flow through its emitter-collector circuit and primary winding 30.

Eventually transistor Q1 is biased into saturation, and the current through primary winding 30 can no longer increase. With constant current through primary winding 30, the induced voltage in secondary winding 32 falls to zero. The field around secondary winding 32 collapses developing a voltage of reverse polarity to drive the transistor Q1 abruptly to cutoff. Current flow through the emitter-collector circuit of transistor Q1 and primary winding 30 of output transformer T1 falls to zero. Capacitor C2 thereupon begins charging again to repeat the cycle.

A main secondary winding 34 of output transformer T1 has one side connected through an impedance-matching capacitor C3 to one electrode 36 of the fluorescent lamp 12. The other side of the main secondary winding 34, taken from tap 37, is connected directly to the other electrode 38 of the fluorescent lamp. A pair of auxiliary secondary windings 40 and 42 are utilized to supply heating current to filaments (not shown) of the fluorescent lamp 12 to enhance its starting capabilities. A capacitor C4 is connected from the junction between capacitor C3 and electrode 36 either to the lower side of the auxiliary secondary winding 42, as shown, or to tap 37.

Referring back to the description of the power oscillator 10, it is recalled that current flows through the primary winding 30 only during the time that the transistor Q1 is conducting. Consequently, the primary winding is energized with relatively short current pulses. The voltage induced in the main secondary winding 34 is therefore in the form of a spiked pulse. The turns ratio of the primary winding 30 to the main secondary winding 34 is such that the voltage amplitude of these spiked pulses is large relative to the DC voltage across lines 26 and 28. It will be appreciated that if the fluorescent lamp were energized directly with these spiked pulses, operating efficiency would be quite low due to the rather short pulse width.

In order to overcome this deficiency, the parameters of capacitors C3 and C4 are selected such that they form in combination with secondary windings 34 and 42 a resonant tank circuit. As a consequence, these spiked pulses induced in secondary winding 34 shock-excite this tank circuit, thereby developing electrical energy of essentially sinusoidal waveform for energizing the fluorescent lamp. The resonant frequency of the tank circuit, consisting of capacitor C3 and C4 and secondary windings 34 and 42, is adjusted in accordance with the pulse repetition rate of the power oscillator 10 such that the secondary voltage spikes reinforce the tank circuit oscillations. Capacitor C4 further serves to stabilize the oscillator 10 during starting.

The circuit parameters of the power oscillator and tank circuit may, for example, be selected such that the sinusoidal excitation supplied to the lamp 12 has a frequency of 5 kilocycles to take advantage of the improved efficiency inherent in the operation of fluorescent lamps at high frequencies. It is preferred, however, to operate at a frequency above the audible range, such as 20 kc. to avoid the somewhat objectionable hum encountered at lower frequencies.

It has been found that with the step-up output transformer T1 and the resonant tank circuit having a reasonably high Q, the voltage gain is sufficiently high to ignite the fluorescent lamp 12 without preheating. Consequently, the auxiliary secondary windings 40 and 42 may not be necessary. The typical fluorescent lamp starter is not required in either case.

The positive side of the battery 16 is connected to line 26 through the network 18 to line 26, while its negative side is connected to line 28 by line 50. Thus, with switches S1 and S2 closed, both the AC source 13 and the battery 16 are connected to energize the power oscillator 10. The transformer ratio of the input transformer T2 is selected such that the full-wave rectified voltage across lines 26 and 28 has a magnitude which is approximately one-half volt greater than the rated voltage of the battery 16. Thus, as long as the source 13 is delivering AC power, the battery 16 is trickle-charged through resistor R1. Diode D1, included in the network 18, is back-biased.

When, for some reason, AC power from source 13 is not forthcoming, the full-wave rectified voltage across lines 26 and 28 fails to zero. Diode D1 in the network 18 becomes forward-biased to automatically directly electrically connect the battery 16 across lines 26 and 28. The power oscillator 10 is thus energized from the battery 16. Diodes D2 and D3 block battery current from flowing through the input transformer secondary winding 22. When the AC power output from source 13 resumes, diode D1 is again back-biased to effectively remove the battery 16 from direct electrical connection across lines 26 and 28. Again, battery 16 is trickle-charged through resistor R1.

If switch S1 is closed and switch S2 is open, it is seen that the battery 16 is charged from the AC source 13, but the fluorescent lamp 12 is not energized. Thus, the battery 16 may still be recharged without having to also energize the fluorescent lamp.

It is thus seen that the disclosed embodiment of the invention is normally energized from a conventional 60-cycle, 112 VAC source to drive a fluorescent lamp 12. When AC power is disrupted, the battery 16 automatically takes over to supply the necessary energization, enabling the circuit to drive the fluorescent lamp. When AC power is resumed, it automatically takes over from the battery as the energization source for the fluorescent lamp driver circuit. During those times when the AC power source is delivering energization, the battery 16 is being recharged so that it will be fully capable of taking over when called upon.

While it is contemplated that the disclosed fluorescent lamp driver circuit be installed as a fixture in a building where AC power is available, it will be appreciated that it is readily susceptible to use in a portable lighting unit powered exclusively by the battery 16. AC power, when available, would then be used primarily to recharge the battery.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to secure by Letters Patent is:

1. A high frequency fluorescent lamp energizing circuit normally operable from low frequency power mains, with provision for automatic switching to standby battery operation in the event of AC power failure, comprising in combination:
   (A) a solid state oscillator having emitter, collector and base electrodes,
   (B) a rectified DC power supply having an input for connection to an AC power main, and positive and negative DC output lines for energizing said solid state oscillator,
   (C) a multi-winding output transformer having a primary winding connected between the negative output line of said rectified DC power supply and the collector electrode of said oscillator,
      (1) a first resistor, a second winding of said output transformer connected through said resistor from said negative output line to the base electrode of said oscillator,
   (D) means connecting the emitter electrode of said oscillator to the positive output line of said rectified DC power supply,
      (1) a feedback coupling capacitor connected between said emitter and said second winding,
   (E) a second resistor, a standby battery connected through said second resistor between the positive and negative output lines of said rectified DC power supply,
      (1) a unidirectional diode shunt connected across said second resistor, and;
   (F) a secondary winding of said output transformer being adapted to be connected to the opposite end terminals of a fluorescent lamp, and having,
      (1) a capacitor connected thereacross to form a resonant tuned circuit with the inductance of said transformer, whereby high frequency pulses generated by said oscillator are converted into sinusoidal wave form.

2. The circuit defined in claim 1 wherein said oscillator and said resonant circuit are tuned to supply excitation to the fluorescent lamp at a frequency of approximately 20 kilocycles.

3. The circuit defined in claim 1 wherein said solid state oscillator delivers periodic current pulses of relatively short duration,
   (1) said resonant circuit being excited in response to said current pulses.

4. The circuit defined in claim 1 wherein said second winding of said output transformer develops regenerative feedback voltage for application across said emitter and base electrodes.

5. The circuit defined in claim 4 including a resistor connected from a junction between said coupling capacitor and said second winding to said negative DC output line, whereby said capacitor and resistor form a timing circuit for determining the operating frequency of said solid state oscillator.

6. The circuit defined in claim 1 including an impedance-matching capacitor connected between one side of said secondary winding and one electrode of said fluorescent lamp.

7. The circuit defined in claim 6 wherein said output transformer includes:
   (1) an auxiliary secondary winding connected to supply heating current to the filaments of said fluorescent lamp.

References Cited

UNITED STATES PATENTS 3,356,891 12/1967 Godard _____ 315—86
3,373,313  3/1968 Prines et al. _____ 315—86

JOHN W. HUCKERT, *Primary Examiner.*

S. BRODER, *Assistant Examiner.*

U.S. Cl. X.R.

315—86, 160, 173